United States Patent Office 2,701,225
Patented Feb. 1, 1955

2,701,225

β,β,β - TRICHLORO - α - HYDROXYETHYLPHOSPHONIC DIMETHYL ESTER AND INSECTICIDAL COMPOSITION THEREOF

Walter Lorenz, Wuppertal-Elberfeld, Germany, assignor to Farbenfabriken Bayer Aktiengesellschaft, Leverkusen, Germany, a corporation of Germany No Drawing. Application September 15, 1953, Serial No. 380,356

Claims priority, application Germany September 20, 1952

2 Claims. (Cl. 167—22)

The present invention relates to a new phosphonic ester and to a method of making the same. It further relates to the use of the new compound as insecticide in particular in the control of flies.

It is known to prepare α-hydroxy-alkyl phosphonic acids by reacting aliphatic or aromatic aldehydes with phosphorous acid or by reacting phosphorus trichloride with these aldehydes and subsequent hydrolysis of the phosphoric chlorides obtained (cf. e. g. M. I. Kabatschnik: Fortschritte der Chemie (russ.), vol. 16, 1947). It is further known to prepare dialkyl esters of α-hydroxy-alkyl phosphonic acids by the addition of aldehydes to dialkyl phosphites. As suitable aldehyde chloral has been used in this reaction and as dialkyl phosphite diethyl phosphite, its substitution products and higher homologues thereof.

I have now found that also dimethyl phosphite reacts in the same way with chloral. The reaction compound thus obtained has not been described hitherto. It is β,β,β-trichloro-α-hydroxyethylphosphonic dimethyl ester and corresponds to the following formula:

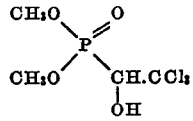

From the known higher homologues the new compound is distinguished by particular properties. While of the known compounds it is maintained in general that they are useful as toxic agents in insecticidal compositions, the new compound shows an unexpectedly increased insecticidal effect in particular towards flies. The new compound further has a lower toxicity towards mammals. Thus the lethal dose for mice (subcutaneous) of the new dimethyl compound is 500 mg./kg., of the known diethyl compound 100 mg./kg. On the other hand the dimethyl compound applied in 0.001% concentration kills flies within 24 minutes while under the same conditions the diethyl compound kills the flies only after 130 minutes; that means practically that the latter compound has to be applied in a much higher concentration to achieve the same effect.

The new compound can be applied as insecticide in the usual manner; it will be mixed with carriers conventional in the application of insecticides. Useful carriers are solids, liquids and also low boiling liquids immediately evaporating under ordinary pressure; thus the insecticide can be employed as dust, solution, emulsion, or aerosol. Practical mixtures are e. g.

(1) 11 g. of active compound, 4 kg. of sugar, 100 litres of water, applied to stable floors by means of a watering-pot.

(2) 1 to 2% solution in mixed halides (Freons) or methyl chloride or other aerosol mixtures in a closed vessel furnished with a spray-nozzle for household use.

(3) 0.5 to 5% aqueous solution used as soil disinfectant.

(4) 1 part active compound+1 part emulsifier applied as 0.1% aqueous emulsion against house and fruit flies.

The present invention is illustrated by the following examples without, however, being limited thereto:

Example 1

75 grams of chloral are dropped to 60 grams of dimethyl phosphite at an initial temperature of 25° C. The temperature slowly rises to 50° C. and is kept at 50–60° C. by external cooling. After cooling the oil is dissolved in benzene, and the benzene solution is washed with a sodium bicarbonate solution and dried with anhydrous sodium sulfate. After the solvent has been distilled off, an oil is left which almost completely solidifies. After sucking off and short washing with an icy cold mixture of ether and petrol ether, the trichloro-α-hydroxyethylphosphonic dimethyl ester is obtained in the form of colorless needles with a melting point of 81° C. Yield 90 grams.

Example 2

2 grams of β,β,β-trichloro-α-hydroxyethylphosphonic dimethyl ester are homogeneously ground with 98 grams of talc. If 20 milligrams of the dust thus obtained are given into a Petri dish with flies in it, the first of these flies are unable to fly after 5 minutes. 50 per cent of the flies are killed after 6 minutes, the remaining ones after 7 minutes.

Example 3

1.3 cc. of a 1 per cent solution of βββ,,-trichloro-α-hydroxyethylphosphonic dimethyl ester in acetone are applied to filter paper measuring 10 by 10 centimeters, and tested with flies. After 25 minutes all flies are killed.

Example 4

A sheet of cardboard measuring about 100 square centimeters is impregnated with 20 cc. of a 3 per cent aqueous sugar solution containing 0.1 gram of β,β,β-trichloro-α-hydroxyethylphosphonic dimethyl ester. If the cardboard thus impregnated with the active ingredient is exposed to flies in a Petri dish, the first of these flies are lying on their backs already after 3 minutes, and after 5–6 minutes all flies are unable to fly.

Example 5

If in the evening a 1 per cent solution of β,β,β-trichloro-α-hydroxyethylphosphonic dimethyl ester in ethylene dichloride is sprayed e. g. by means of an aerosol mixture upon the walls in a room in which are flies, so that approximately 100 milligrams of active ingredient are applied per square meter, no surviving flies are found the next morning.

Example 6

A 0.01 per cent aqueous solution of β,β,β-trichloro-α-hydroxyethylphosphonic dimethyl ester in which 3 per cent of sugar are dissolved, is poured by means of a watering-can on the floor in rooms where flies are mostly present, such as in stables. Flies in these rooms are killed after a short time.

I claim:

1. β,β,β-Trichloro-α-hydroxyethylphosphonic dimethyl ester of the formula:

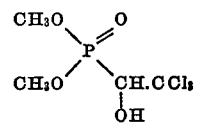

2. Insecticidal composition containing β,β,β-trichloro-α-hydroxyethylphosphonic dimethyl ester as active agent and an insecticidal adjuvant as a carrier therefor.

References Cited in the file of this patent

UNITED STATES PATENTS 2,579,810     Fields _____ Dec. 25, 1951

OTHER REFERENCES

Barthel et al.: J. A. C. S., vol. 76, No. 16, pp. 4186–7.